United States Patent [19]

Maitani et al.

[11] 4,024,553
[45] May 17, 1977

[54] ELECTRICAL FOCAL PLANE SHUTTER WITH MECHANICAL CONTROL MECHANISM OPERATIVE UPON ELECTROMAGNETIC FAILURE

[75] Inventors: Yoshihisa Maitani; Akihiko Hashimoto; Fujio Enomoto, all of Hachioji, Japan

[73] Assignee: Olympus Optical Co., Ltd., Tokyo, Japan

[22] Filed: May 15, 1975

[21] Appl. No.: 577,697

[30] Foreign Application Priority Data

June 6, 1974 Japan .................... 49-64427

[52] U.S. Cl. .................... 354/242; 354/258; 354/268
[51] Int. Cl.² .................... G03B 9/34
[58] Field of Search .................... 354/268, 241–244, 354/234, 258

[56] References Cited

UNITED STATES PATENTS

| | | | |
|---|---|---|---|
| 2,758,526 | 8/1956 | McFadden | 354/242 |
| 3,657,982 | 4/1972 | Uno et al. | 354/242 |
| 3,821,757 | 6/1974 | Kobori | 354/244 |
| 3,829,877 | 8/1974 | Kitai | 354/242 |
| 3,875,580 | 4/1975 | Watanabe et al. | 354/268 |
| 3,930,263 | 12/1975 | Urano | 354/268 |

*Primary Examiner*—L. T. Hix
*Assistant Examiner*—J. A. LaBarre
*Attorney, Agent, or Firm*—Ostrolenk, Faber, Gerb & Soffen

[57] ABSTRACT

An electrical focal plane shutter is provided of a type in which subsequent to a running of a first blind of the shutter, a second blind of the shutter is constrained from movement by an electromagnet until a desired exposure period passes, whereupon the electromagnet is deenergized to permit a running of the second blind. The electromagnet is controlled by an electromagnet control device including a light receiving element which is used for photometry. The shutter includes a shutter detent mechanism for preventing a shutter release operation when an electric storage battery contained in an associated camera is exhausted. The shutter further includes a high speed shutter operation control mechanism which assures against the instability of the operation of the electromagnet when the shutter is operating at a high speed, and also includes a manual shutter control mechanism for establishing a shutter operation period of a given length in a purely mechanical manner.

3 Claims, 8 Drawing Figures

ELECTRICAL FOCAL PLANE SHUTTER WITH MECHANICAL CONTROL MECHANISM OPERATIVE UPON ELECTROMAGNETIC FAILURE

BACKGROUND OF THE INVENTION

The invention relates to an electrical focal plane shutter, and more particularly to such a shutter of the type in which the second blind of the focal plane shutter is restrained from running by an electromagnet which is controlled by an electromagnet control device including a light receiving element which is used for photometry.

As is well known, an electrical focal plane shutter is constructed so that the first blind is caused to run upon shutter release, while the running of the second blind is constrained by an electromagnet for producing a desired exposure period. One of the problems involved with the shutter of this kind is the fact that when a power supply for the electromagnet is exhausted or its output substantially reduced, the timing at which the second blind is caused to run becomes no longer precisely controllable, thus preventing a proper exposure. Another difficulty occurs with the electricl focal plane shutter of the type described in a high speed operation such as 1/1000 to 1/2000 second in that if a diaphragm aperture is preset, the length of time during which the shutter should be open is limited to a very small value to thereby result in an almost instantaneous deenergization of the electromagnet, causing a running of the second blind substantially simultaneously with the first blind when it should run in following relationship with respect to the latter, and thus effectively causing a failure of the shutter to open. All the operations of an electrical focal plane shutter take place automatically, and even when an exposure period is determined manually, the movement which occures within the shutter itself depends on electrical means. Where every operation depends on the electrical means, there occurs an inconvenience when the power supply is exhausted or its output reduced in that the shutter is locked, leaving a photographer at a loss as to what to do to correct the malfunction. On the other hand, the provision of a mechanism for operating the shutter mechanically in addition to the electrical means is not advisable in consideration of the space requirement within the camera or the increased cost therefor.

SUMMARY OF THE INVENTION

It is a first object of the invention to provide an electrical focal plane shutter which eliminates the above mentioned first problem by the provision of a shutter detent mechanism including control means for engagement with a first blind detent pawl a disable a shutter operation in the event a power supply is exhausted or its output reduced, thereby preventing a running of the first blind if a shutter button is inadvertently depressed.

In accordance with the invention, the control means becomes effective to prevent the disengagement of the first blind detent pawl from its associated gear when the electromagnet is not deenergized, thus avoiding the need for a special arrangement or the trouble of detecting a reduction in the output of the power supply. In this manner, an improper exposure is prevented in a very simple and secure manner.

It is a second object of the invention to provide an electrical focal plane shutter which overcomes the second problem mentioned above by the provision of a high speed shutter operation control mechanism including a second detent pawl for engagement with the second blind gear, the second detent pawl being controlled by a second blind control cam which rotates together with the first blind gear and by an arm member which determines an exposure period during a high speed shutter operation, thereby mechanically controlling a very rapid operation of the electromagnet to an exposure period on the order of 1/1000 to 1/2000 second so as to assure a satisfactory shutter opening.

In accordance with the invention, a high speed shutter operation which can not be achieved through the control of the electromagnet can be assured by a mechanical control which is separate from the electromagnet. In this manner, a failure of taking pictures upon depression of a shutter button is completely eliminated.

It is a third object of the invention to provide an electrical focal plane shutter which eliminates the above mentioned third problem by the provision of a manual shutter control mechanism which allows an exposure period on the order of 1/60 to 1/30 second to be mechanically obtained with a simple arrangement, thus completely eliminating the above mentioned disadvantage of a shutter which entirely depends on electrical means. In accordance with the invention, a fixed exposure period can be obtained separately from the operation of the electrical means. As a result, a camera can be operated in a satisfactory manner in the event the output of the power supply is reduced. In addition, an exact flashlight photographing is assured.

The electrical focal plane shutter according to the invention may be provided with at least one of the shutter detent mechanism, the high speed shutter operation control mechansim and the manual shutter control mechanism for enhancing its function.

DETALED DESCRIPTION OF THE PREFERRED EMBODIMENT

Figure 1:
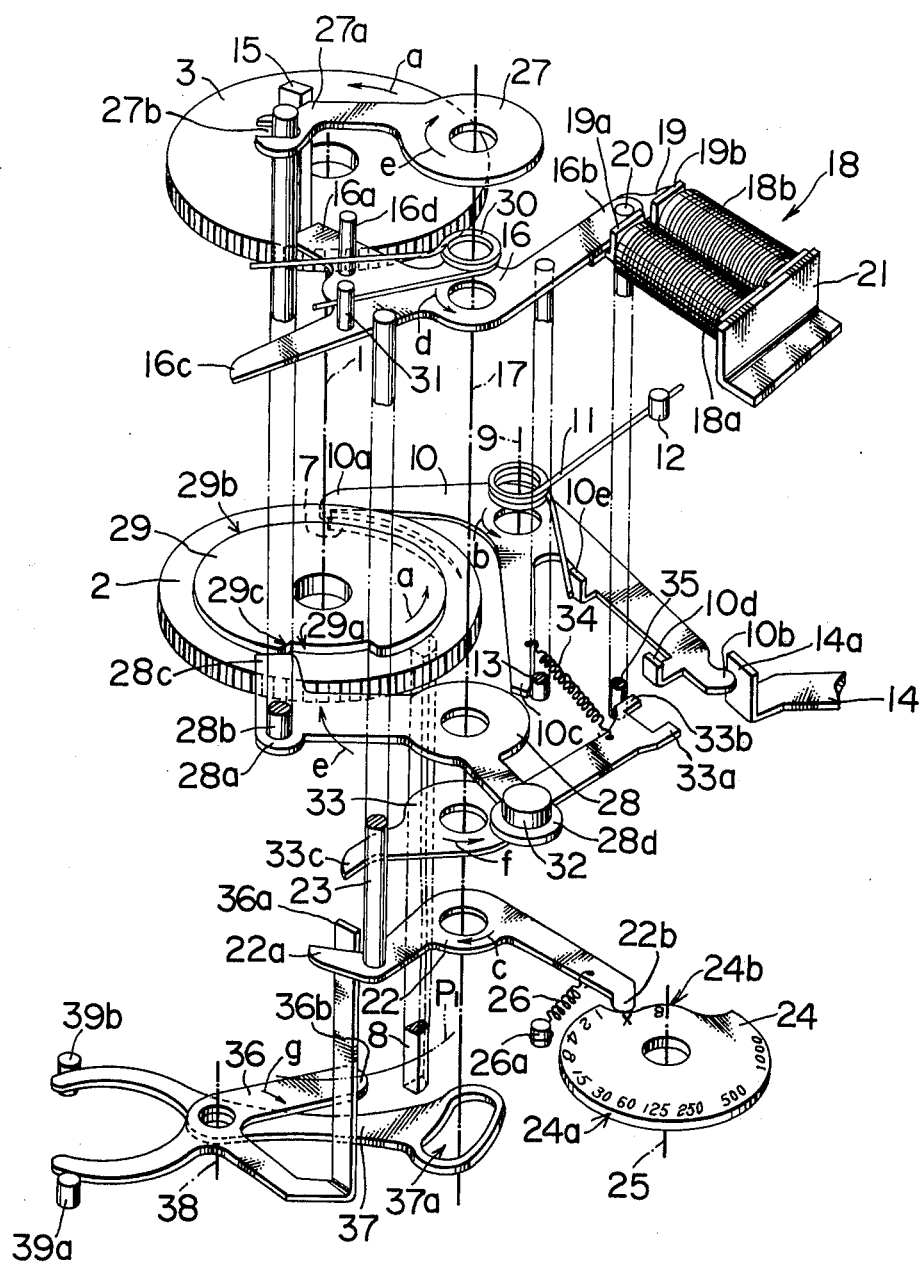
FIG. 1 is an exploded perspective view of the electrical focal plane shutter constructed in accordance with one embodiment of the invention.
Figure 3:
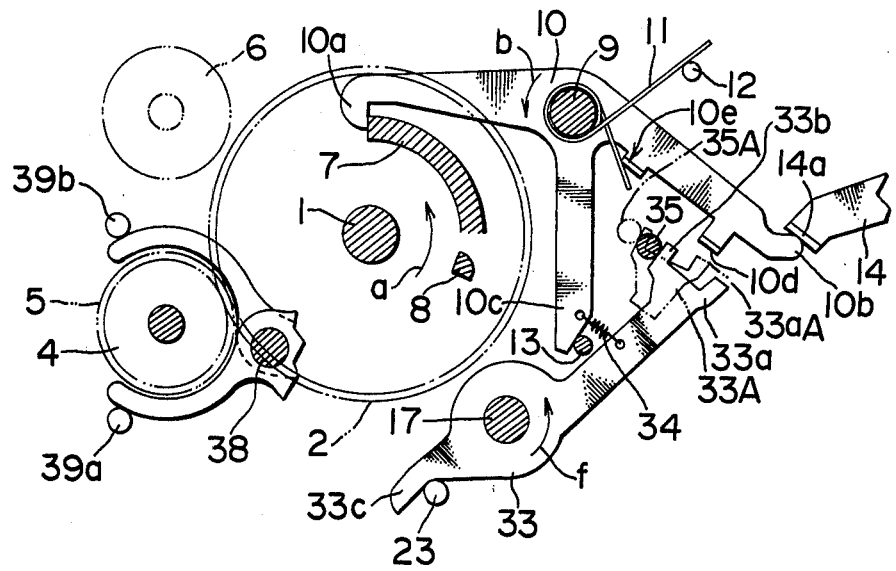

Referring to FIG. 1, a first blind gear 2 is fixedly mounted on a gear axle 1 indicated by phantom lines, on which a second blind gear 3 is rotatably mounted. As indicated in FIG. 3, the gear 2 meshes with a drive gear 5 (shown in phantom lines) of a first blind drum 4 for constraining a running of the first blind of the shutter (not shown) which has been taken up on the first blind drum 4 during a shutter charging operation. In a similar manner, the gear 3 meshes with a drive gear (not shown) of a second blind drum 6 which is shown in phantom lines in FIG. 3 for constraining a running of the second blind shutter (also not shown) which is taken up on the second blind drum 6. When the first blind runs, the gear 2 rotates in the direction indicated by an arrow a indicated in FIG. 1, and the gear 3 rotates in the same direction to permit a running of the second blind. It is to be understood that the energy for causing the first and second blinds to run is supplied by the respective gears which are energized during a film winding or a shutter charging operation.

On its lower surface and adjacent to the periphery, the gear 2 is provided with an arcuate portion 7 of a thickness which gradually increases in the direction of rotation thereof, and rearwardly of the arcuate portion 7 as viewed in the direction of rotation of the gear 2, a projection 8 for releasing the detent on the second blind gear is fixedly monted also in the lower surface of the gear 2. The projection serves to obtain a fixed exposure period, and its function will be described more fully later.

A detent member 10 for the first blind gear is pivotally mounted at 9 and has three arms. One of the arms of the detent member 10 is formed with a pawl 10a at its end which is located so as to be opposite to the arcuate portion 7 of the gear 2 (see FIG. 3). The detent member 10 for the first blind gear is additionally provided with an abutment 10b at the end of another arm and also with an engaging portion 10c which is formed at the end of a third arm. The arm having the abutment 10b is formed with a control piece 10d and a spring abutment 10e, both of which are formed by bending from the material of the detent member 10. A coiled spring 11 is loosely fitted over the pivot 9, and has its one end bearing against the spring abutment 10e and its other end bearing against a stationary pin 12, thereby urging the detent member 10 to rotate about the pivot 9 in the direction indicated by an arrow b. During the initial phase before a shutter release operation, the detent member 10 has its pawl 10a engaged with the arcuate portion 7 of the gear 2, thus constraining it against rotation. Also at this time, the engaging portion 10c of the detent member 10 bears against a pin 13 which is fixedly mounted on another detent member 16 for the second blind gear to be described later, whereby the extent through which the detent member 10 can rotate is limited.

A pusher member 14 which operates in response to a shutter release operation has a nose 14a which is located opposite to the abutment 10b of the detent member 10. The pusher member 14 may be constructed to be operationally integral with a mirror which switches between a photographing and a finder light path of a single lens reflex camera, for example. In either event, the pusher member is interlocked with a shutter release, and its nose 14a is adapted to urge the abutment 10b against the spring 11, thus causing the detent member 10 to rotate in the opposite direction from that of the arrow b so as to move the pawl 10a away from the arcuate portion 7 of the gear 2 to thereby release the first blind gear 2 for initiating a running of the first blind.

Figure 4:
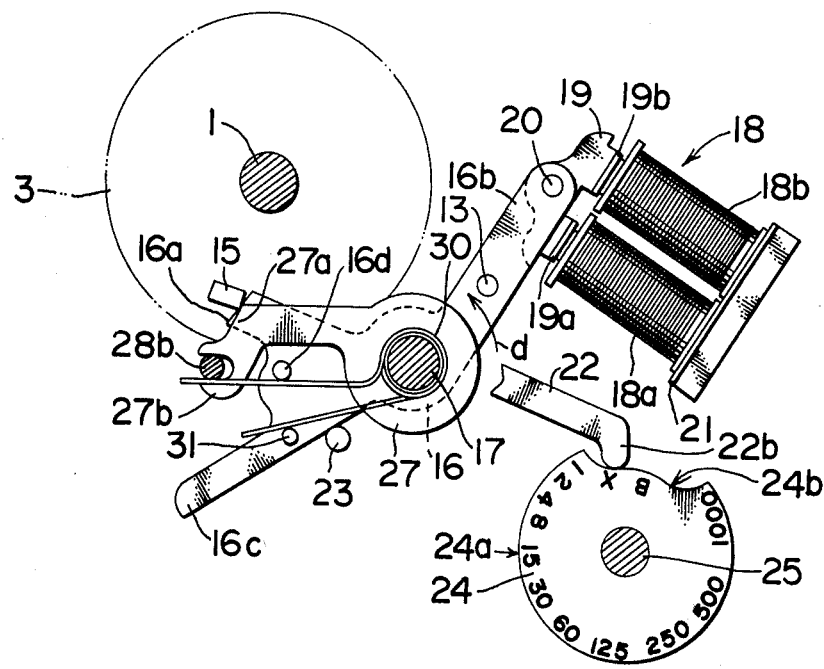

A stop 15 is fixedly mounted on the upper surface of the second blind gear 3 adjacent to the periphery thereof, and is normally engaged by a pawl 16a which is formed at the end of one arm of the detent member 16 for the second blind gear 3 (see FIG. 4). The detent member 16 for the second blind gear is rotatably mounted on a support axle 17 indicated in phantom lines in FIG. 1, and has another arm 16b which carries a pin 20 for pivotally mounting an armature 19 thereon. The armature 19 has a pair of spaced armature pieces 19a, 19b which are formed by bending from the plane of the armature 19. These armature pieces are disposed in opposing relationship with a pair of elecromagnet units 18a, 18b of an electromagnet assembly 18 which is secured to a stationary plate 21. As will be described later, the electromagnet assembly 18 is energized under the control of a suitable means upon a shutter release operation, attracting the armature pieces. However, it should be noted that the armature 19 is initially also retained in the same position as it is attracted by the electromagnet assembly 18 (see FIG. 1) by suitable locking means including levers (not shown), and is unlocked therefrom in response to a shutter release operation. When the armature 19 is in its attracted position or in an equivalent position, the detent member 16 for the second blind gear has its pawl 16a in engagement with the projection 15 of the second blind gear 3, thus preventing a rotation thereof. The detent member 16 also has a third arm 16c and a pin 16d thereon, the arm 16c being disposed in opposing relationship with a pusher rod 23 which is fixedly mounted on one arm 22a of a control member 22 which has the combined function of releasing the detent member for the first blind gear and locking the detent member for the second blind gear (see FIG. 6).

Figure 2:
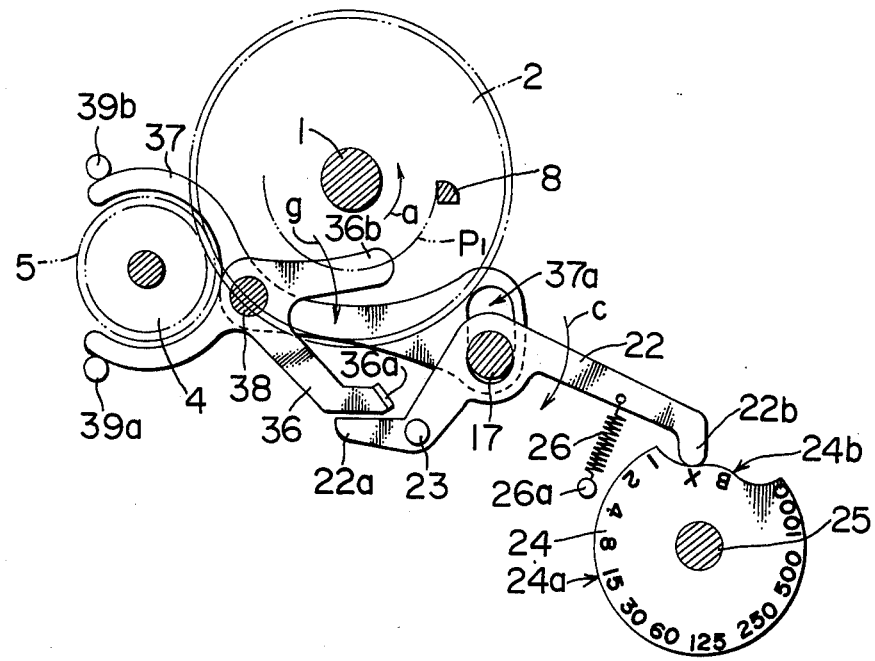
FIGS. 2 to 6 are fragmentary plan views of various parts of the shutter shown in FIG. 1, illustrating their operation.

The control member 22 is rotatably mounted on the support axle 17 on which the detent member 16 is mounted, and has another arm on which an abutment 22b is formed, the abutment 22b being located in opposing relationship with the edge of a position control cam 24 (see FIGS. 1 and 2). The position control cam 24 is mounted on a pivot 25 and has a cam edge 24a of a larger diameter for an automatic setting and another cam edge 24b of a smaller diameter for a manual setting. The cam 24 is provided with a dial of exposure periods on its upper surface, but it should be understood that the cam 24 may be separate from a shutter dial. The second arm of the control member 22 on which the abutment 22b is formed is engaged by one end of a strong spring 26 which has its other end engaged by a stationary pin 26a, whereby the member 22 is urged to rotate in the direction indicated by an arrow c to thereby hold the abutment 22b in bearing engagement against the cam edge of the cam 24.

As is clearly shown in FIGS. 1 and 4, a second detent member 27 for the second blind gear is rotatably mounted on the support axle 17, and has a pawl 27a formed at the end of its one arm, which pawl bears against the projection 15 on the second blind gear 3. On the same arm of the detent member 27 is formed a fork-shaped recess 27b. An arm member 28 for determining a high speed exposure period is rotatably mounted on the support axle 17 and has an arm 28a carrying a connecting rod 28b which in turn fits into the recess 27b. the recess 27b may have any other suitable configuration such as an elongated slot. The arm 28a of the member 28 is formed with an abutment 28c at its end, which abutment is adapted to engage a second blind control cam 29, the cam operating to determine an exposure period during a high speed shutter operation. The cam 29 has a first cam portion 29a of a small diameter and a second cam portion 29b of a large diameter, and is secured to the gear axle 1 integrally with the first blind gear 2.

A coiled spring 30 is loosely fitted over the support axle 17, and has its one end anchored to a pin 31 which is fixedly mounted on the arm 16c of the detent member 16 and its other end bearing against the connecting rod 28b, thereby urging the detent member 16 to rotate in the direction indicated by an arrow d and also urging the second detent member 27 for the second blind gear and the arm member 28 to rotate in the direction indicated by an arrow $e$. Thus, the pawl 27a of the second detent member 27 engages the projection 15 on the second blind gear 3 while the arm 28c for the arm member 28 abuts against the edge of the second blind control cam 29.

The second detent member 27 for the second blind gear, the connecting rod 28b, the arm member 28 and the second blind control cam 29 constitute together a high speed shutter operation control mechanism, and operates to determine an exposure period during a high speed shutter operation independently from the operation of the electromagnet assembly 18. It will be noted that the arm member 28 has another arm 28d on which a pin 32 is fixedly mounted for producing an operation signal, as by actuating a switch, not shown, in response to the operation of the arm member 28.

Adjacent to the control piece 10d of the detent member 10 is disposed a pair of projections 33a and 33b formed on one arm of a control member 33 for the detent member of the first blind gear (see FIG. 3) which is rotatably mounted on the support axle 17 and is urged to rotate in the direction indicated by an arrow $f$ by a spring 24 which extends between this arm and the engaging portion 10c of the detent member 10, thus maintaining the projection 33b in abutment against an interlocking rod 35 which depends downwardly from the arm 16b of the detent member 16, as viewed in FIG. 1. Initially the projection 33a is disengaged from the control piece 10d (second position). The control member 22 has another arm 33c which is disposed in opposing relationship with the pusher rod 23 extending from the member 22. A brake member 36 is rotatably mounted together with another brake member 37 on an axle 38, and has its one arm extended initially in the general plane thereof and then in an upward direction therefrom so as to form an abutment 36a which is disposed adjacent to the arm 22a of the member 22 on which the pusher rod 23 is mounted (see FIG. 2). The brake member 36 has another arm 36b which extends into a path of rotation $P_1$ of the projection 8 as shown in FIG. 2 so as to be urged thereby at a given period of time after the commencement of rotation of the first blind gear 2, as will be further described later. When the arm 36b is urged by the projection 8, the brake member 36 cooperates with the other brake member 37 to exert a braking force on the first blind drum 4 in the manner of a pair of scissor-like members. Also the abutment 36a drives the arm 22a of the member 22 to deactivate the locking function of the second blind gear by the member 22. The projection 8 and the brake member 36 form an unlocking mechanism, and it will be appreciated that the brake member 36 may be replaced by a member which is designed to detect a location of the first blind gear. An elongate slot 37a is formed at the end of one arm of said other brake member 37, and is loosely fitted over the support axle 17. A pair of stops 39a, 39b (see FIG. 2) are provided adjacent to those portions of the both brake members 36, 37 which bear against the first blind drum 4 for constraining the extent of their motion.

In the present embodiment, the high speed shutter operation control mechanism is constructed in the manner mentioned above, and the shutter detent mechanism is essentially constituted by the control member 33 for the detent member of the first blind gear and the interlocking rod 35 depending from the detent member 16. Additionally, a manual shutter control mechanism essentially comprises the control member 33, the detent member 16 for the second blind gear, the member 22 for releasing the detent member of the first blind gear and for locking the detent member of the second blind gear, the position control cam 24, the projection 8 and the brake member 36 which also serves to detect the rotation of the first blind gear.

In operation, the electrical focal plane shutter thus constructed operates as follows:

I. Normal Operation

A normal operation as intended herein refers to a condition of the camera in which the power supply for the electromagnet has a sufficient output to provide an automatic operation of the shutter.

Figure 6:
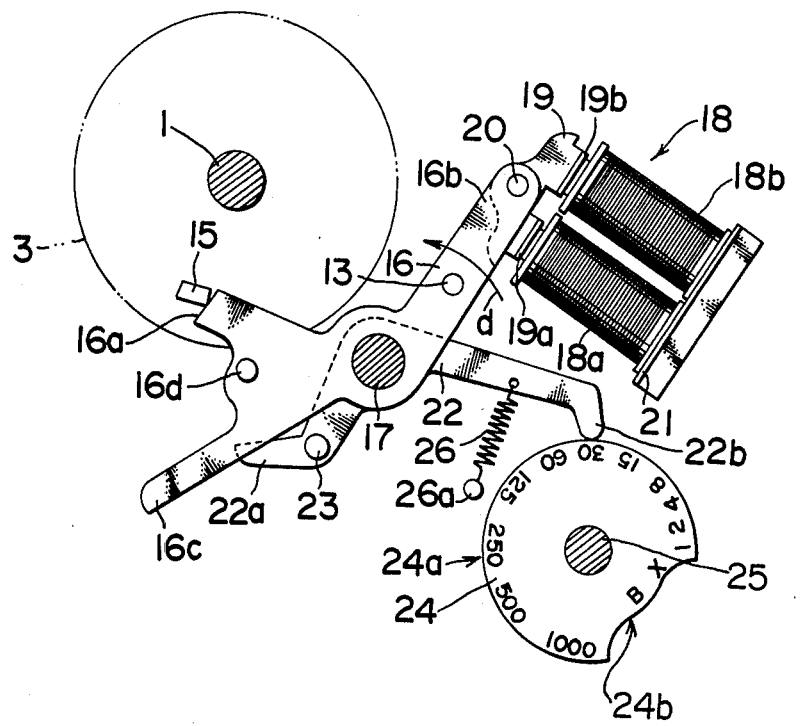

A normal operation can be achieved by a usual operation of the camera. The position control cam 24 will be externally rotated to a position in which the cam edge 24a of a larger diameter is located opposite to the arm 22b of the member 22. Such an initial condition prior to a shutter release operation is illustrated in FIG. 6 where it will be noted that the member 22 is rotated counter-clockwise about the axle 17 from the position shown in FIG. 2. Also at this time, the detent member 16 for the second blind gear is locked by suitable locking means in a position which is equivalent to its position assumed when the armature 19 is attracted by the electromagnet assembly 18, and thus the control member 33 has its projection 33a disengaged from the control piece 10d of the detent member 10 (see FIG. 3). Thus the control member 33 assumes the position in which it permits a release of the detent member 10 associated with the first blind gear for operation.

Upon shutter release, the pusher member 14 operates on the abutment 10b of the detent member 10, whereby the latter is rotated against the action of the spring 11 in the direction opposite to that indicated by the arrow $b$ about the axle 9. As the detent member 10 roates, its pawl 10a is disengaged from the arcuate porton 7 of the first blind gear 2, thus releasing it for commencing its running.

On the other hand, the locking action applied by said means (not shown) to the detent member 16 is released upon shutter release, but is continued by the operation of the electromagnet assembly 18 which operates to maintain the detent member 16 in the same initial position as before.

Figure 5:
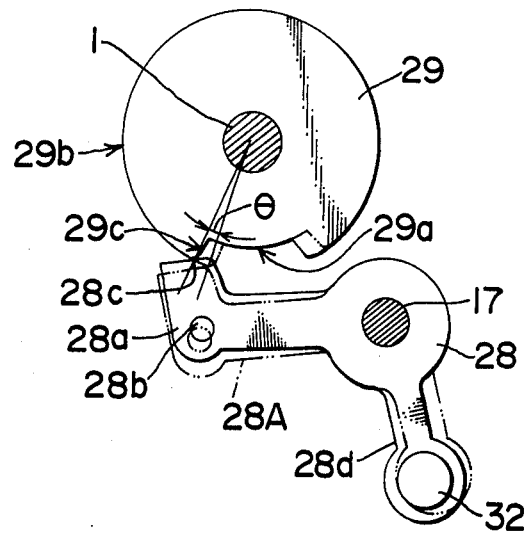

When the first blind gear 2 rotates as the first blind runs, the second blind control cam 29 rotates integrally therewith, causing its cam portion 29b of a larger diameter to bear against the abutment 28c of the arm member 28 to displace it to a position 28A shown in phantom lines in FIG. 5. This displacement of the arm member 18 is transmitted to the second detent member 27 for the second blind gear through the connecting rod 28b, whereby the pawl 27a is disengaged from the projection 15 formed on the second blind gear 3. The cam portion 29b of the second blind control cam 29 is formed so that it maintains the arm member 28 in its displaced position and hence maintains the pawl 27a disengaged from the projection 15 during substantially one revolution of the cam 29.

The electromagnet assembly 18 is preset or controlled by a control circuit including a photometric element so as to be deenergized after a desired exposure period to release the armature 19. When the armature 19 is released, the detent member 16 for the second blind gear rotates in the direction of the arrow $d$ (see FIG. 1) under the action of the spring 30, whereby its arm 16c bears against the pusher rod 23 on the member 22. Thereupon, the pawl 16a is disengaged from the projection 15, permitting a rotation of the second blind gear 3 to initiate a running of the second blind.

Toward the end of rotation of the first blind gear 2, the projection 8 associated with the first blind gear 2 bears against the arm 36b of the brake member 36 to cause a rotation thereof in the direction of an arrow g (see FIG. 1), whereby the brake member 36 cooperates with the other brake member 37 to apply a braking force on the first blind drum 4, thereby constraining a movement of the first blind. At this time, the abutment 36a of the brake member 36 does not abut against the arm 22a of the member 22 since the latter is located out of the path of rotation of the abutment 36a.

By design, the pressure applied to the detent member 10 by the pusher member 14 is released immediately after a shutter release operation, so that after the first blind gear is released, the detent member 10 therefor rapidly returns to a position in which it can lock the latter, thus waiting for a return thereof to its original position after one revolution, for reengagement therewith.

The abutment 28c of the arm member 28 is in sliding contact with the second blind control cam 29, which integrally rotates with the first blind gear 2, under the action of the spring 30, and enters the cam portion 29a of a reduced diameter toward the end of rotation of the cam 29. Thereupon, the arm member 28 rotates in the direction of the arrow e (see FIG. 1), which rotation is transmitted through the connecting rod 28b to the second detent member 27 for the second blind gear, thus positioning the pawl 27a into a path of rotation of the projection 15 on the second blind gear 3 in order to lock it to interrupt the rotation of the second blind gear 3. At a suitable time after the deenergization of the electromagnet assembly 18, the detent member 16 for the second blind gear is returned to the initial position which it would assume when the armature 19 is attracted by the electromagnet assembly 18, through the suitable means mentioned above, for engaging the pawl 16a with the projection 15. It will be noted that such a return of the detent member 16 can be achieved in connection with the next shutter charging operation.

II. Operation when the power supply for the electromagnet assembly is exhausted or its output reduced to cause an incomplete operation of the electromagnet assembly or to render it inoperable In this case, the operation is similar to that described immediately above until a shutter release operation is performed. However, in this instance, a shutter release operation does not result in a full energization of the electromagnet assembly 18, so that the detent member 16 is no longer locked in its initial position and instead immediately rotates in the direction of the arrow d upon shutter release. However, it will be noted that even if the detent member 16 is disengaged from the projection 15 on the second blind gear 3, the latter can not rotate as a result of the engagement between the projection 15 and the second detent member 27. As the detent member 16 rotates in this manner, the interlocking rod 35 associated therewith is displaced to a position 35A shown in phantom lines in FIG. 3, and the control member 33 follows such movement of the rod 35 to a displaced position 33A shown in phantom lines, under the action of the spring 34. At this time, the projection 33a will be displaced to a position 33aA (first position) shown in phantom lines, whereby the detent member 10 moving in the direction opposite to that indicated by arrow b as a result of the movement of the pusher member 14 will have its control piece 10d in abutment against the projection 33a, which thus prevents a further movement thereof. As a resut, the pawl 10a cannot release the arcuate portion 7 of the first blind gear 2, thus preventing a further movement of the shutter parts.

III. Operation when it is desired to produce a given exposure period independently from the operation of the Electromagnet Assembly or in the event the Electromagnet Assembly is inoperable The position control cam 24 is externally operated to bring the cam edge 24b of a reduced diameter in opposing relationship with the abutment 22b of the member 22. Thus, the member 22 is rotated in the direction of the arrow c from the position shown in FIG. 6, so that the pusher rod 23 urges the detent member 16 and the control member 33 to positions shown in solid lines in FIGS. 4 and 3, respectively. Under this condition, the projection 33a of the member 33 is not located opposite to the control piece 10d of the detent member 10 as in the mode I, so that upon shutter release, the detent member 10 fully rotates in the direction opposite to that indicated by the arrow b, disengaging the pawl 10a from the arcuate portion 7 on the first blind gear 2. The detent member 16 is maintained in the same position as it assumes when the armature 19 is attracted by the electromagnet assembly 18. The first blind gear 2 is released from the detent member 10, and as it rotates with a running of the first blind, a movement of the second blind control cam 29, the arm member 28 and the second detent member 27 for the second blind occurs in interlocked relationship therewith in the same manner as mentioned above in connection with the mode I, whereby the pawl 27a is disengaged from the projection 15 on the second blind gear 3.

As the first blind gear 2 further rotates, the projection 8 associated therewith urges the arm 36b of the brake member 36 to cause it to rotate in the direction of the arrow g. Then, the brake member 36 cooperates with the other brake member 37 to apply a braking force on the first blind drum, 4, and the abutment 36a urges the member 22 to rotate in the opposite direction from that indicated by the arrow c. When the member 22 rotates in this direction, the detent member 16 for the second blind gear follows it by rotating in the direction of the arrow d, disengaging the pawl 16a from the projection 15. Thereupon, the second blind gear 3 is permitted to rotate, causing a running of the second blind to complete a shutter operation. The subsequent locking of the first and second blinds take place in a manner similar to mode I.

The length of time from the commencement of the rotation of the first blind gear 2 until the brake member 36 is urged by the projection 8 for movement can be established to any desired exposure period. It may be chosen to be 1/60 or 1/30 second so that a shutter operation for synchronization with a strobo unit or a flashlight can be achieved independently from the operation of the electromagnet assembly 18.

IV. An exposure period during a high speed shutter operation may be determined independently from the operation of the Electromagnet Assembly In an electrical shutter, an extremely short exposure period less than 1/1000 second may be automatically set where the diaphragm aperture is preset, but the actual shutter operation fails to follow such a rapid operation and may not provide a shutter opening. However, with the aperture of the invention, an exposure period for a high speed shutter operation can be achieved independently from the operation of the electromagnet assembly.

The procedure of the operation of the apparatus is similar in this case to that described previously in connection with the mode I, but because this is a high speed shutter operation, the electromagnet assembly 18, while becoming energized upon a shutter release operation, is deenergized very shortly thereafter, releasing the detent member 16. Thus the detent member 16 rotates in the direction of the arrow $d$, disengaging its pawl 16a from the projection 15 on the second blind gear 3.

When the first blind gear 2 commences its rotation in response to a shutter release operation, the second blind gear control cam 29 integrally rotates therewith as mentioned previously. The cam 29 has a gently curved transition area 29c intermediate the portions 29a and 29b having a small and a large diameter, respectively. During the time the cam 29 rotates through an angle $\theta$ corresponding to the extent of the transition area 29c, as shown in FIG. 5, since the commencement of its rotation, the arm member 28 is displaced to the position 28A as a result of the transition area 29c urging the abutment 28c. As the arm member 28 is displaced in this manner, the second detent member 27 for the second blind gear follows it, whereby its pawl 27a is disengaged from the projection 15 on the second blind gear 3, and since the detent member 16 is already disengaged therefrom, a rotation of the second blind gear 3 is permitted, thus causing a running of the second blind to close the shutter opening. The subsequent operation of the various parts takes place in the similar manner as in the mode I.

In the apparatus of the invention, the transition area 29c of the cam 29 and the abutment 28c of the arm member 28 are dimensioned so that the time interval for the arm member 28 to be displaced from the position shown in solid line to the position 28A shown in phantom lines in FIG. 5 corresponds to an exposure period of 1/1000 to 1/2000 second, thereby reliably producing an exposure period for a high speed shutter operation, independently from the operation of the electromagnet assembly 18. Where the electromagnet assembly 18 is deenergized at a time later than the time when the displacement of the arm member 28 is terminated, the detent member 16 will be disengaged from the projection 15 at a time later than the second detent member 27 is disengaged therefrom, so that the shutter operation under this condition is similar to that described in connection with mode I.

Figure 7:
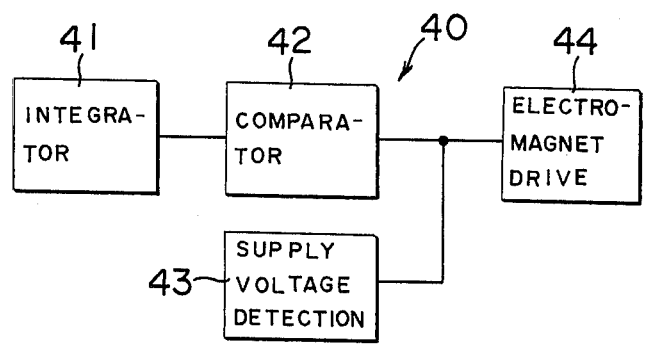
FIG. 7 is a block diagram of an electromagnet control device.
Figure 8:
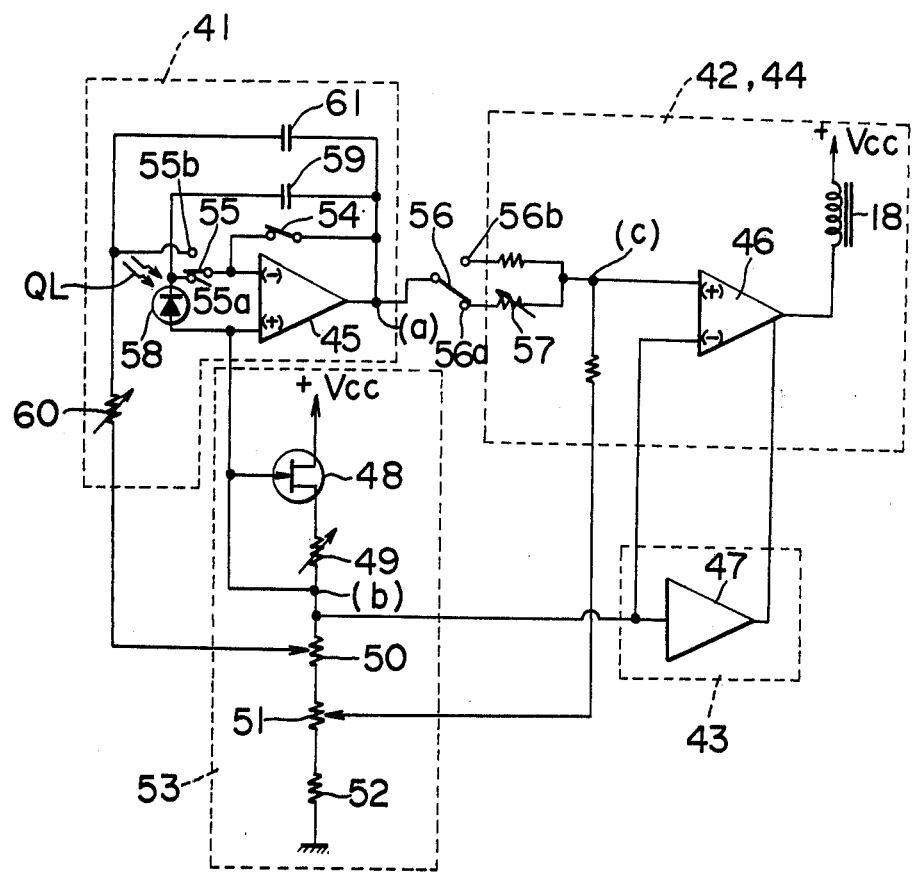
FIG. 8 is a circuit diagram of the electromagnet control device.

Referring to FIGS. 7 and 8, an example of an electromagnet control device 40 which controls the operation of the electromagnet assembly 18 will be described. The device 40 comprises an integrator circuit 41, a comparator circuit 42, a supply voltage detection circuit 43 and an electromagnet drive circuit 44, the specific construction of these circuits being illustrated in FIG. 8. In FIG. 8, the integrator circuit 41 includes an operational amplifier 45; the comparator and electromagnet drive circuits 42, 44 include a high gain differential amplifier 46; and the supply voltage detection circuit 43 includes a high gain differential amplifier 47 which includes a supply voltage divider (not shown). The amplifier 47 remains inoperative when the supply voltage is sufficiently high to provide a normal operation of the electromagnet assembly.

In FIG. 8, a field effect transistor 48 is connected in series with a bank of variable resistors 49, 50, 51 and a fixed resistor 52 across a positive voltage source and ground, forming a constant voltage source 53 which utilizes the self-bias of the transistor 48.

The integrator circuit 41 includes a trigger switch 54 which is operated upon shutter release, and a change-over switch 55 having a movable contact which can be switched between an auto-terminal 55a and a manual terminal 55b. A change-over switch 56 is connected between the integrator circuit 41 and the comparator and drive circuits 42, 44, the switch 56 being switchable between an auto terminal 56a and a manual terminal 56b. When the shutter is released with the change-over switches 55, 56 being thrown to the auto terminals 55a, 56a, respectively, the closure of the trigger switch 54 causes the output voltage of the operational amplifier 45, that is, the voltage $Va$ at the point ($a$), to be negatively fed back to the inverted input terminal (−) thereof, and consequently the output voltage $Va$ will assume a value which is equal to the voltage applied to the non-inverting input terminal (+) from the junction ($b$) between the resistors 49 and 50. Thus, the voltage applied through a variable resistor 57 to the non-inverting input terminal (+) of the amplifier 46, $Vc$, will be lower than the voltage at its inverted input terminal (−) which is connected with the point ($b$), so that the electromagnet assembly 18 is energized, causing the detent member 16 to lock the second blind gear 3.

When the first blind gear 2 is released to permit a running of the first blind in response to a shutter release operation, and the trigger switch 54 is opened upon termination of the release operation, no voltage is applied across a photometric light receiving element 58 such as a photovoltaic element connected across the both input terminals of the amplifier 45, and a short circuit current flows therethrough in proportion to the amount of light being received, QL, charging a capacitor 59 connected in series therewith. As the capacitor 59 charges, the output voltage $Va$ of the amplifier 45 rises at a rate proportional to the amount of light QL incident on the element 58. As the output voltage $Va$ of the amplifier 45 rises, the voltage $Vc$ applied to the non-inverting input terminal (+) of the amplifier 46 also rises and ultimately reaches the value which is equal to the voltage $Vb$ at terminal ($b$). Thereupon, the relative magnitudes of the voltage applied to the both input terminals of the amplifier 46 are reversed, so that the output voltage of the amplifier is also reversed, deenergizing the electromagnet assembly 18. Thus, the detent member 16 releases the second blind gear 3 to permit a running of the second blind, thereby completing a shutter operation. The variable resistor 57 can be manually set in accordance with information such as a film speed, for example.

When the change-over switches 55, 56 are thrown to the manual terminals 55b, 56b, respectively, the closure of the trigger switch 54 initially maintains the output voltage $Va$ of the amplifier 45 equal to the voltage Vb. When the trigger switch 54 is subsequently opened, a voltage which is equal in magnitude to a difference between the output voltage Va of the amplifier 45 and a voltage on the movable point on the variable resistor 50 will be applied across a series combination of a variable resistor 60 and a capacitor 61, charging this capacitor. In response to such operation of the integrator circuit 41, the amplifier 46 operates to drive the electromagnet assembly 18 in the same manner as in the auto mode.

The amplifier 47 has its one terminal connected with the point (b) and its other input terminal connected with a supply voltage divider circuit (not shown) which is contained in the network of the amplifier 47. The amplifier 47 has its output terminal connected with one end of the electromagnet driver circuit which is connected with the amplifier 46. When the supply voltage is sufficiently high, the output from the amplifier 47 has no influence upon the operation of the electromagnet assembly 18. However, when the supply voltage is reduced and becomes insufficient to provide a proper shutter operation, the relative magnitude of the voltage Vb and the output voltage from the supply voltage divider circuit is reversed and the output signal from the amplifier 47 is such that the electromagnet assembly 18 is normally maintained deenergized irrespective of the opening or closing of the trigger switch 54 or the exposure period. Thus, the electromagnet assembly 18 remains inoperable, and the control member 33 maintains the detent member 10 in a position in which it locks the first blind gear, thus preventing a running of the first blind.

What is claimed is:

1. An electrical focal plane shutter including a shutter detent mechanism, the shutter comprising:
   a first blind gear for driving a first blind of the shutter;
   a second blind gear for driving a second blind of the shutter;
   first and second detent members for locking the first and second blind gears, respectively, against rotation;
   drive means interlocked with a shutter release member for driving the first detent member from a first position towards a second position to thereby release the first blind gear to permit rotation thereof;
   an electromagnet assembly including control means movable from a first position to a second position for operating said second detent member to release the second blind gear at a given exposure period after the commencement of a running of the first blind to thereby permit the second blind gear to begin running;
   first means on said second detent member for engaging said first detent member, said second detent member maintaining said control means in its first position when said first detent member is in its first position and releasing said control means to move to its second position when said first detent member has moved at least to an intermediate position which is located between its first and its second positions, said first detent member being incapable of releasing said first blind gear until it has moved to its second position;
   a control member for controlling the operation of said first detent member, second means on said second detent member said control member engaging said second means and movable responsive to said second means to assume a first position in which the control member prevents the first detent member from moving beyond its intermediate position when said first detent member has moved to its intermediate position and when the electromagnet assembly is inoperable due to a reduction in the output of a power source therefor and for assuming its second position in which it releases the first detent member from engaging the first blind gear when the first detent member has moved to its intermediate position and when the electromagnet assembly is operating in a normal manner.

2. The device of claim 1 further comprising biasing means for biasing said second detent member towards its second position; said control means comprising an armature coupled to one end of said second detent member;
   the first means of said second detent member comprising a projection engaging one end of said control member; said second detent member second means comprising a projection engaging said first detent member;
   biasing means for urging said first detent member toward its first position and for urging said control member toward its releasing position, such that when said first detent member moves to its intermediate position, said second detent member is urged by its biasing means to move said armature away from the electromagnetic assembly and to its second position in the event that said electromagnet means is inoperable to move said second projection enabling the control member to move from its releasing position to a blocking position thereby preventing the first detent member from moving beyond its intermediate position.

3. An electrical focal plane shutter including a shutter detent mechanism, the shutter comprising:
   a first blind gear for driving a first blind of said shutter;
   a second blind gear for driving a second blind of said shutter;
   a first detent member movable from a first position wherein said first detent member prevents the rotation of said first blind gear to a second position wherein said first detent member permits the rotation of said first blind gear;
   a second detent member movable from a first position wherein said second detent member prevents the rotation of said second blind gear to a second positon wherein said second detent member permits the rotation of said second blind gear;
   drive means associated with a shutter release member for moving said first detent member from said first to said second position during a shutter release operation commenced by the actuation of said shutter release member;
   an electromagnetic assembly including control means for moving said second detent member from said first to said second position at a given time period after the commencement of the rotation of said first blind gear;
   a third detent member movable between a first position wherein said third detent member prevents the rotation of said second blind gear and a second position wherein said third detent member permits the rotation of said second blind gear;
   a cam coupled for rotation with said first blind gear;

cam follower means coupling said cam to said third detent member for moving said third detent member from said first to said second position a short time period after the commencement of rotation of said first blind gear, said short time period corresponding to a high speed shutter operation and being determind by the configuration of a cammed surface of said cam;

biasing means coupled between said cam follower means and said second detent member for biasing said cam follower means against said cammed surface of said cam and for biasing said third detent member into said first position, said biasing means applying a first spring force to said cam follower means when said second detent member is in said first position and applying a second lesser force to said cam follower means when said second detent member is in said second position.

* * * * *